United States Patent [19]

Belotserkovsky et al.

[11] Patent Number: 4,591,912
[45] Date of Patent: May 27, 1986

[54] PEAKING CIRCUIT FOR VIDEO DRIVER STAGE

[75] Inventors: Isaac M. Belotserkovsky, Indianapolis; David E. Hollinden, Bloomington, both of Ind.

[73] Assignee: RCA Corporation, Princeton, N.J.

[21] Appl. No.: 666,602

[22] Filed: Oct. 30, 1984

[51] Int. Cl.[4] .......................... H04N 3/23; H04N 5/68
[52] U.S. Cl. .................... 358/166; 358/171; 358/242
[58] Field of Search ............... 358/166, 160, 171, 184, 358/242, 37, 34, 243

[56] References Cited

U.S. PATENT DOCUMENTS 4,463,385  7/1984  Parker .................................. 358/242
4,549,214  10/1985  Hinn ..................................... 358/172

OTHER PUBLICATIONS

RCA Service Data Bulletin (1983) for CTC-111 Color Television Chassis, RCA Corp., Indianapolis, Ind.

Primary Examiner—Tommy P. Chin
Attorney, Agent, or Firm—P. J. Rasmussen; P. M. Emanuel; R. H. Kurdyla

[57] ABSTRACT

A kinescope driver stage in a television receiver includes an input pre-driver transistor and an output driver transistor arranged in a cascode amplifier configuration. To enhance the high frequency response of the driver stage, a capacitor is coupled from the signal input of the driver transistor to a point of reference potential.

5 Claims, 1 Drawing Figure

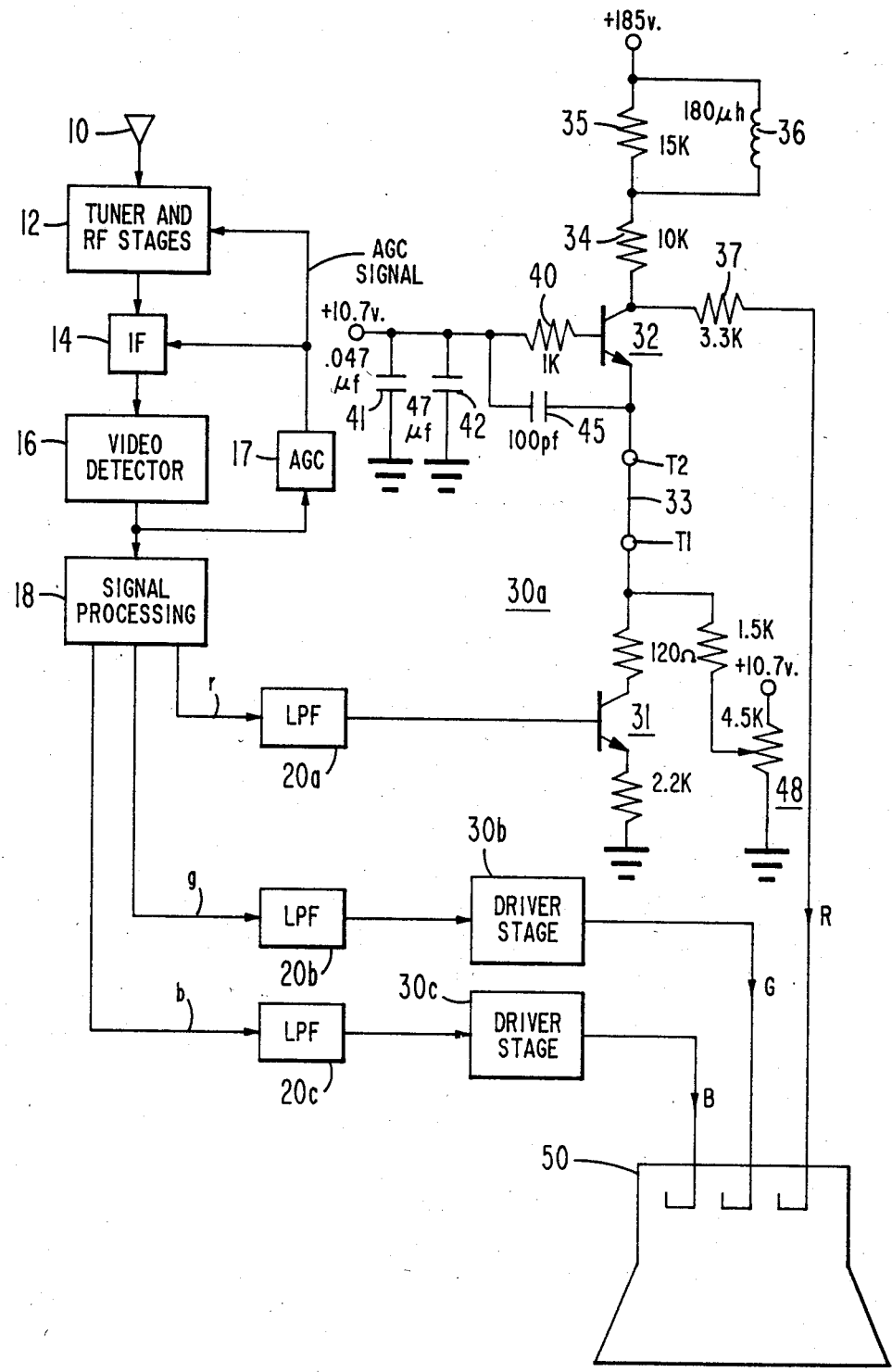

PEAKING CIRCUIT FOR VIDEO DRIVER STAGE

FIELD OF THE INVENTION

This invention concerns a high frequency peaking circuit associated with a video signal output stage for driving an image display device such as a kinescope in a television receiver.

BACKGROUND OF THE INVENTION

A video output driver stage is used in video signal processing and display systems such as television receivers or video monitors to supply high level video signals to an intensity control electrode of an image reproducing kinescope. A cascode amplifier configuration exhibits a good high frequency response among other features, and is therefore advantageously used as a video output driver amplifier. A cascode video output amplifier employing bipolar transistors, for example, typically includes a low voltage input pre-driver transistor arranged as a common emitter amplifier, and a high voltage output driver transistor arranged as a common base amplifier. The collector output of the common emitter input transistor drives the emitter input of the common base output transistor. In the case of a color television receiver, a cascode video driver stage is associated with each of the red, green and blue color signal channels.

In many television receiver designs it is desirable to situate the pre-driver transistor on a circuit board containing low level video signal processing circuits, and to situate the higher power output driver transistor on a circuit board attached to the neck of the kinescope in the vicinity of the kinescope socket. In this way parasitic capacitances presented to the output circuit of the driver transistor are greatly reduced because the collector output of the driver transistor is located close to the driver cathode intensity control electrode of the kinescope and, as a result, parasitic capacitances associated with the wire connecting the output of the driver transistor and the kinescope cathode are minimized. This arrangement is substantially immune to the effects of parasitic capacitance and stray signal pick-up associated with a relatively long wire (e.g., approximately 8 to 10 inches in length) connecting the collector output of the pre-driver transistor to the emitter input of the driver transistor. This results because of the low impedance at the emitter input of the driver transistor, and because of the relatively strong signal being conveyed by the connecting wire.

However, the connecting wire can undesirably act as an antenna for radiating high frequency components of the video signal and harmonics thereof, which can be picked-up by sensitive circuits of the receiver such as RF tuner circuits and intermediate frequency (IF) signal processing circuits. The radiated high frequency components represent interference signals which can adversely affect the operation of the RF and IF circuits such that distortion of a reproduced video image results.

The magnitude of the radiated high frequency interference signals can be reduced by reducing the level of high frequency currents flowing in the connecting wire. One way to accomplish this is by means of a low pass filter coupled prior to the pre-driver amplifier to attenuate the high frequency components of the video signal. The desired high frequency response can be restored afterwards by means of a peaking network associated with the output circuit of the driver transistor. Such a peaking network commonly includes a peaking coil in the collector output circuit of the driver transistor. However, the ability of peaking coil to fully restore the attenuated high frequency components of the video signal is limited by several factors related to the design of the driver stage, so that the peaking coil may be unable to restore the attenuated high frequency response.

SUMMARY OF THE INVENTION

In accordance with the principles of the present invention there is disclosed herein a peaking network for a cascode video driver amplifier, which may be used alone or in combination with an output peaking coil to enhance the high frequency response of the driver amplifier. Specifically, the disclosed peaking network includes a capacitance coupled between the input of the output driver amplifier and a point of reference potential.

BRIEF DESCRIPTION OF THE DRAWING

The single FIGURE of the drawing shows a portion of a color television receiver including a video driver stage in accordance with the principles of the present invention.

DESCRIPTION OF THE PREFERRED EMBODIMENT

Broadcast television signals received by an antenna 10 are applied to a tuner 12 including controllably tuned radio frequency (RF) amplification stages. Output signals from tuner 12 are applied to an intermediate frequency (IF) signal processing and amplifying network 14. IF signals from network 14 are detected by a video detector 16, and the detected signals are processed by video signal processing circuits 18. Circuits 18 include luminance and chrominance signal processing circuits comprising frequency selection, amplifying, matrix and brightness and contrast control circuits for providing low level color image representative signals r, g and b. An automatic gain control (AGC) signal is developed by means of an AGC network 17 in response to the amplitude of the detected video signal from network 16. The level of the AGC signal is an indicator of the strength of the received television signal and controls the signal gains of both the RF amplifier stage in tuner 12 and the IF amplifier in network 14 to maintain the detected video signal from network 16 at a desired level.

The r, g and b color signals are respectively coupled via similar low pass filters 20a, 20b and 20c to video output kinescope driver stages 30a, 30b and 30c which provide high level amplified color signals R, G and B with a magnitude suitable for driving cathode intensity control electrodes of a color image reproducing kinescope 50. Since the driver stages are similar in structure and operation, only the circuit details of red signal driver stage 30a are shown and will be discussed.

Driver stage 30a includes a low voltage, common emitter, input pre-driver amplifier transistor 31 arranged in a cascode amplifier configuration with a high voltage, common base, video output driver amplifier transistor 32. Transistor types suitable for driver device 32 include the 2N 6558 available from Motorola and the S1298 available from Toshiba. The collector output load circuit of transistor 32 includes a resistor 34 and a high frequency peaking coil 36 shunted by a resistor 35. Resistor 35 and coil 36 are connected in common to the red, green and blue signal driver stages. Video output signals are coupled to the red signal cathode of kinescope 50 via a current limiting kinescope arc protection resistor 37. Base bias for output transistor 32 is provided by a supply voltage, e.g., +10.7 volt, coupled to the base of transistor 32 via an arc protection resistor 40. Capacitors 41 and 42 filter the supply voltage. A pre-set potentiometer 48 serves to adjust the DC bias of driver stage 30a. A high operating voltage for driver 30a is provided by a +185 volt source coupled to the collector circuit of transistor 32.

In this system pre-driver transistor 31 and low pass filter 20a are situated on a circuit board also including low level signal processing circuits associated with signal processing network 18. Driver transistor 32, resistors 34, 35, 37 and 40, peaking coil 36, and a peaking capacitor 45 are situated on another circuit board attached to the neck of kinescope 50 in the vicinity of the kinescope socket. As a result, parasitic capacitances presented to the output circuit of driver transistor 32 are greatly reduced because the collector output of transistor 32 is located close to the cathode electrode of kinescope 50. With this arrangement, pre-driver transistor 31 and driver transistor 32 are physically separated by several inches (e.g., 8–10 inches), and are connected by means of a wire 33 which couples the collector output circuit of transistor 31 at a terminal T1 to the emitter input circuit of transistor 32 at a terminal T2. This arrangement is substantially insensitive to the effects of parasitic capacitance associated with wire 33 because of the low emitter impedance of transistor 32. The effects of stray signal pick up by wire 33 are negligible because of the relatively strong video signal conveyed by wire 33.

Connecting wire 33 can undesirably act as an antenna for radiating high frequency components of the video signal and harmonics thereof, which can be picked up by sensitive circuits of the receiver such as the RF stages in network 12 and the circuits in IF network 14. The radiated high frequency components when picked up by the RF stages in network 12 and the circuits in IF network 14 are particularly likely to be troublesome when a high signal gain is produced by the AGC signal, and represent interference signals which can affect the operation of the RF and IF circuits such that distortion of a reproduced video image results. The potentially troublesome high frequency components and harmonics are often associated with rapid black-to-white video signal amplitude transistions such as are experienced with both broadcast television program material and alphanumerics or graphics displays. The strength of the field of the radiated high frequency signals is related to the length of connecting wire 33.

Low pass filter 20a reduces the likelihood of image distortion due to the described high frequency interference components by attenuating high frequency components of the video input signal applied to pre-driver transistor 31, thereby reducing the magnitude of high frequency current flowing in wire 33. For this purpose filter 20a illustratively exhibits a high frequency cut-off (at the −3 db point) of approximately 2.6 MHz. Since it is desired for video output signals from driver transistor 32 to exhibit a bandwidth of about 3.2 MHz, the high frequency response of the video output signals must be enhanced to compensate for the high frequency attenuation produced by filter 20a.

In some systems the desired high frequency enhancement, or peaking, can be accomplished by means of a peaking coil such as coil 36 alone. However, in other systems the peaking coil may be unable to provide the necessary high frequency enhancement due to various design factors associated with the driver stage, such as the value of the load resistor (i.e., resistor 34). For example, if the value of load resistor 34 is reduced to increase peaking, reduced signal gain undesirably results, the peaking frequency changes, and the power dissipation of the output transistor increases resulting in a need for additional heatsinking capability with associated additional parasitic capacitance. Using a larger peaking coil to increase the amount of peaking can result in a lowered peaking frequency and a distorted transient response.

In the disclosed system additional high frequency peaking is provided by means of peaking capacitor 45 in accordance with the principles of the present invention. Capacitor 45 is coupled from the emitter of driver transistor 32 to a point of AC signal ground potential via a low impedance path provided by bias supply filter capacitors 41 and 42 which are located on the low level signal processing circuit board in this example. The plate of capacitor 45 remote from the emitter of transistor 32 could also be connected to signal ground directly, rather than as shown, in systems which have a signal ground point available on the kinescope socket circuit board.

Ordinarily one would expect that capacitor 45 connected as shown in the main signal path between transistors 31 and 32 would attenuated high frequency video signal components at the emitter of transistor 32. Surprisingly, however, it has been observed that capacitor 45 instead produces a high frequency peaking effect when a certain value of capacitor 45 is chosen. In the illustrated system with the component values shown it has been determined empirically that with a value of 100 pf as shown for capacitor 45, a peaking response of approximately +2 db was produced at 1.9 MHz and the video driver stage exhibited the desired 3.2 MHz bandwidth.

It is believed that the latter peaking effect may be attributable to the resonance of capacitor 45 with an inductance, the specific source of which is uncertain, exhibited at the emitter input of driver transistor 32. The inductance associated with peaking coil 36 has been found to have no effect upon the peaking response produced by capacitor 45.

Capacitor 45 preferably should be located as near to the emitter of transistor 32 as is practical and can be used with or without a peaking coil such as coil 36 in the output circuit of the driver stage.

We claim:

1. In a video signal processing and display system including a source of video signals, and an image display device having an intensity control electrode, a video output driver stage comprising:
   an input amplifier with an input electrode coupled to said source of video signals, and an output electrode;
   an output amplifier arranged in a cascode amplifier configuration with said input amplifier, said output amplifier having an input electrode coupled to said output electrode of said input amplifier, and an output electrode coupled to said intensity control electrode of said display device for providing video drive signals thereto; and a peaking capacitance coupled from said input electrode of said output amplifier to a source of reference potential via a low impedance path for peaking high frequency video signal components.

2. A driver stage according to claim 1, wherein said output electrode of said input amplifier is coupled to said input electrode of said output amplifier via a connecting wire subject to radiating high frequency video signal components; and said peaking capacitance is coupled nearer to said input electrode of said output amplifier than to said output electrode of said input amplifier.

3. A driver stage according to claim 2, wherein a video signal path for conveying video signals to said input electrode of said input amplifier includes a low pass filter for attenuating high frequency components of said video signal; and said peaking capacitance assists to restore said attenuated high frequency components.

4. A driver stage according to claim 1, wherein said image display device is a kinescope with a cathode intensity control electrode;

said input amplifier comprises a first transistor with a base input electrode, a collector output electrode and a common emitter electrode; and said output amplifier comprises a second transistor with an emitter input electrode, a collector output electrode and a common base electrode.

5. A driver stage according to claim 4, wherein a source of bias voltage is coupled to said base electrode of said second transistor;

a capacitive filter network is coupled to said bias source for filtering said bias voltage; and said peaking capacitance is a capacitor coupled from said emitter of said second transistor, to said reference potential via said capacitive filter network.

* * * * *